United States Patent [19]

Grossbach

[11] 4,135,760

[45] Jan. 23, 1979

[54] SLIDING DOOR ASSEMBLY FOR MOTOR VEHICLES

[76] Inventor: Alfred Grossbach, Lindenstrasse 76, 7146 Tamm, Germany

[21] Appl. No.: 802,049

[22] Filed: May 31, 1977

[30] Foreign Application Priority Data

May 31, 1976 [DE] Fed. Rep. of Germany ....... 2624296

[51] Int. Cl.$^2$ ............................................. B60J 5/06
[52] U.S. Cl. .................................... 296/155; 308/3 R
[58] Field of Search .................. 296/155; 49/209, 216, 49/218; 308/3 R; 403/80

[56] References Cited

U.S. PATENT DOCUMENTS

| 2,883,598 | 5/1958 | Sloyan ................................ 308/3 R |
| 3,348,421 | 10/1967 | Boice .................................. 308/3 R |
| 3,376,082 | 4/1968 | Soder ................................. 308/3 R |
| 4,025,104 | 5/1977 | Grossbach ......................... 296/155 |

Primary Examiner—Robert R. Song
Attorney, Agent, or Firm—Toren, McGeady and Stanger

[57] ABSTRACT

A sliding door assembly for motor vehicles includes a supporting system mounted on a frame of the motor vehicle and a door carried by the supporting system for sliding longitudinal movement. The supporting system has an arm pivotally mounted at one end to the frame of the motor vehicle and carries a multi-part guide head for pivotal movement at the other end. The door supports a horizontally extending guide rail for substantially the entire width of the door for cooperative engagement with the guide head to accomplish sliding movement of the door. The guide rail includes support fittings and a pair of tubular members in spaced parallel relationship carried between the fittings. Opposite surfaces of the tubular members form sliding guides for sliding engagement with the guide head. The sliding door is opened by first displacing it to an intermediate open position parallel to the closed position through pivotal movement of the supporting system and then to a fully opened position by sliding movement of the guide rail in the guide head.

22 Claims, 9 Drawing Figures

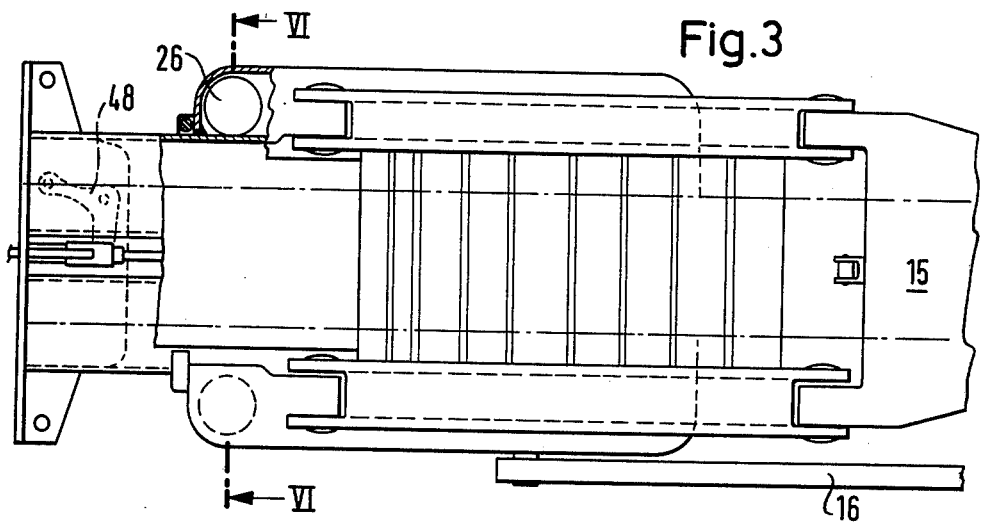
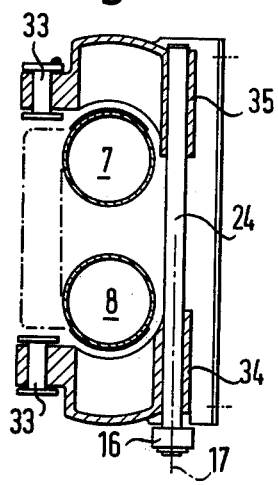
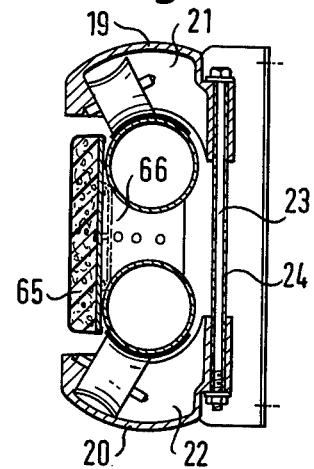
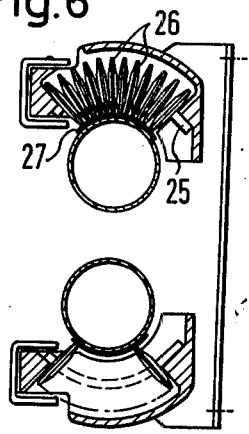
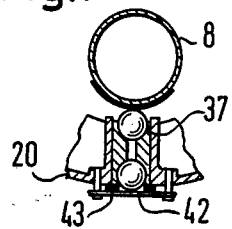
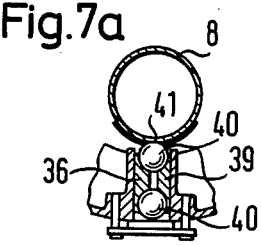

SLIDING DOOR ASSEMBLY FOR MOTOR VEHICLES

The invention relates to a sliding door for vehicles, in particular motor vehicles, which is guided over a horizontally directed guide rail extending substantially over the full length of the door, for longitudinal displacement in a supporting system which is mounted on a supporting arm for pivotal movement about a vertical axis, said arm being in turn fitted on the vehicle structure for pivotal movement about a parallel axis, the sliding door being displaceable when being opened first into an intermediate position parallel to its closed position and then in longitudinal direction of the vehicle, and the guide rail having opposite faces forming sliding guides.

Such a sliding door has become known from the prior German specification No. DT PS 17,80,577 and comprises a single guide rail, formed by a hexagonal hollow section or profile differing from the circular form, in particular one standing on a profile edge, which guide rail is completely embraced by a one-piece guide head. Over its profile faces inclined in roof fashion the guide rail is retained in the guide head through the agency of antifriction bearings. Forms of realization of this sliding door suspension in service have shown good results with respect to sturdiness and easy motion of this sliding door suspension. On the other hand, it has been found in the practice also that due to high point-load applied by the ball bearings it is expensive to harden the profile faces of such a guide rail, and that further the use of a one-piece guide head completely surrounding the guide rail requires considerable cost of manufacture and, in view of the use of antifriction bearings, also cost of assembly. Besides, the downwardly cantilevered suspension of the support arm requires much space, so that in low vehicles installation problems arise and ingress is restricted. Further it is known to suspend sliding doors of the above mentioned model type through two guide rails spaced far apart and formed by profiles open on one side, by means of a guide head designed as a four-wheel roll carriage (DT-PS No. 1,177,953). Disadvantages of this known sliding door suspension in the fact, for one thing, that profiles open on one side and simply forming sliding guides inclined toward each other in roof fashion do not have the sturdiness required for safe and torsion-free uptake of the self-supportingly displaceable door body even if they are arranged at a relatively very great distance from each other. The great distance between two guide rails in the door body moreover requires a correspondingly large size of the guide head designed as roll carriage, owing to which the accommodation of other elements installed in the door body, such as window raisers and the like, is either impossible or extremely impeded, apart from the fact that the problem of sufficient hardening of their bearing surfaces arises equally also with such a guide rail arrangement.

In another known design of a sliding door suspension where two mutually spaced guide rails are used (FR-PS No. 698,436), two guide rails made of round material, fitted at a great distance one above the other on the door body, are received in sleeve type guide members fitted on the car body of the vehicle for outward pivoting over supporting arms. With this construction of a sliding door suspension, both the guide rails and the sleeve type supporting members receiving them must be fitted on the outside of the door body or respectively on the car body, so that flush embedment of the door body in the car body side wall when the sliding door is closed cannot be achieved. Lastly still another design of a sliding door suspended on the car body through two guide rails of round material arranged one above the other at a large distance is known where the guide rails are fastened cantilevered and rigidly only at one end on the door body. Apart from a number of disadvantages already explained in connection with the above mentioned sliding door suspensions, this type of a sliding door suspension has in particular the major disadvantage that sufficient stability when the sliding door is partially open is not attainable.

Proceeding from a sliding door of the initially mentioned design, it is the object underlying the invention to design the suspension of such a sliding door in such a way that it is usable in any desired vehicles with at least equal, but preferably greater stability, gets along with a simpler guide rail cheaper to manufacture and equipable with sufficiently hard bearing surfaces and also with a narrower guide head which likewise can be made at less cost, and moreover permits a cheaper and simpler construction of the device for the reciprocal locking of the guide rail relative to the guide head and of the guide head relative to the support arm and finally also the use of a simple and inexpensive construction of the door locking arrangement, in particular the use of an ordinary door lock, in order to be able to use as many quantity-produced parts as possible for the re-equipment of vehicles with sliding doors.

According to the invention, this problem is solved essentially by the fact that the guide rail is formed from two parallel round tubes arranged one above the other and connected together at least at the end faces to form a fitting, and is guided at the top and bottom over their external circumferential wall sections for longitudinal displacement in a guide head consisting of at least two parts, suspended on the car body openable by means of a pivotable support arm, and provided with antifriction bodies arranged in pitch circle form. The mutual distance of the two round tubes forming the guide rail is, according to the invention, smaller than or at most equal to the sum of their diameters. The space between the tubes can advantageously be used for the connecting rod of the front- and rear-end locking arrangement. By the use of two round tubes arranged one above the other at small distance a guide rail which combines narrowness with good longitudinal and torsional stability and has external surfaces constituting sliding guides is obtained at considerably less production cost, since commercial round tube material can be used. The guide rail permits simple and easy application of sufficiently hard bearing surfaces on its faces forming sliding guides, which according to the invention are produced in that on the surfaces forming sliding guides shell type strips, for example of hardened spring steel material, plastic, or other suitable material, are attached by gluing. Furthermore, the pitch-circle type arrangement of the anti-friction bodies makes possible the full utilization of the tube bearing surface and results in a geometrically satisfactory rolling off without wear. According to the invention, in addition, the antifriction bodies are formed by rolls which for mutual support are in the form of truncated cones and therefore roll off precisely on their side faces. On its side toward the interior of the vehicle, the guide rail may, according to a further feature of the invention, be lined with a padding continuous over at least a portion of its length, the padding being fastened through correspondingly shaped supporting members at the faces of the round tubes turned toward each other or turned toward the interior of the vehicle. The supporting members may be formed selectively by block-shaped or else by two-piece shackle type holding members which apply against the circumferential wells of the round tubes facing each other. With the supporting bodies is connected in known manner, in particular by screw connection, the padding, preferably provided with at least one longitudinally extending metallic reinforcement insert or application. According to another feature of the invention, however, the padding may alternatively be fastened through its longitudinally directed stiffening element, directly on the circumferential walls of the round tubes, for example by means of sheetmetal screws. In that case the stiffening element of the padding is formed expediently by a flat or hollow material and is arranged at least partially external relative to the foam core of the padding.

According to another feature of the invention, the guide head consists of two halves, connected together through screw bolts and spacers and held at a distance from each other, each of which has an inner face of pitch circle form associated with the external circumferential walls of the round tubes, and comprises in the region of its end faces at least two, but preferably a series of, antifriction bodies rotatable about an axis curved in pitch circle form, which roll off on the external circumferential walls of the round tubes. The antifriction bodies may be formed by simple disks, whose width is a fraction of their diameter and which are preferably made of a plastic material.

A particularly flat structural form of the guide head can be obtained, according to another feature of the invention, in that its halves are recessed on the side toward the passenger space over a portion of their length, so that, when the sliding door is closed, the supporting arm articulated on the other hand to the car body is at least partially embedded in the inner longitudinal side of the guide head. The supporting arm itself is advantageously formed flat and as a sandwich type hollow body of high strength over its entire length and advantageously represented by an upright honeycomb type hollow body which is closed at the top and bottom by U-sections forming forks for its suspension or articulation. For the reciprocal locking of the guide rail relative to the guide head and of the guide head relative to the supporting arm there is proposed, according to another variant of the invention, a device which consists of a sheetmetal segment, extending in pitch circle form around the supporting arm articulation on the guide head side and fastened below at one end to the supporting arm, and of a control slide received in a bore arranged vertically at the lower guide head half, as well as simple recesses, on the one hand, in the lower round tube of the guide rail and, on the other hand, in the sheetmetal segment connected with the supporting arm. The control slide, expediently consisting of two steel balls received in spaced relation in a sliding piece consisting preferably of plastic, is mounted for longitudinal displacement in a vertically directed bore of the lower guide head half.

A control link, forcibly bringing about the parallel opening movement of the sliding door and associated with the guide head, is articulated according to the invention for pivotal movement about parallel axes on the one hand at the guide head and on the other hand at the car body-side bracket of the supporting arm, its guide head-side articulation being arranged diagonally opposite the guide head-side supporting arm articulation and formed by one of the screw bolts connecting the two guide had halves together. Further the arrangement of the hinge axles of the supporting arm and of the control link is such that when the sliding door is closed, the supporting arm and control link hinge points are aligned parallel to each other and to the longitudinal axis of the guide rail. To create a guide head uniformly usable for different vehicle types, said guide head may have several, in particular two, control link pivot bearings arranged side by side and usable selectively. According to the respective installation requirements, the control link may be formed with a correspondingly flat bend, for example so as to have to weaken the door column less. The closing device of the sliding door may, according to another feature of the invention, be formed so that in its closed position the sliding door is locked at the front end through a swinging latch movable about a vertical axis, at the rear end through a U-shaped swinging lever on the one hand with the door frame, on the other hand, depending on installation conditions, with a holding pin arranged at the supporting arm of the guide head or at the bracket thereof. By a corresponding design a force-locking connection is obtained which can absorb tensile and compressive forces in all directions according to the safety regulations. The swinging latch and swinging lever are connected together through a push-pull rod between the guide tubes and through joints. There is connected to the push-pull rod at the front end a three-arm lever mounted for pivotal movement about a vertical axis, whose third arm is actuable by means of a locking lever, which in turn (is actuable) by the knob of an ordinary door lock. The swinging lever, which jointly with the bracket-side holding pin causes the rear-end locking of the door in its closed position, is two-armed, one lever arm having a U-shaped base profile, and which as a whole is mounted pivotably at one or both round tubes of the guide rail. The holding pin arranged at the supporting arm of the guide head is provided with a roll cooperating with the swinging lever, so that there results durably easy interaction of the door locking elements. The universal use of the sliding door suspension according to the invention is further achieved in that the hinge axle for the control link can be prolonged upwardly and two control links can be provided, for example for heavy doors of commercial vehicles. Lastly it may be provided according to a further feature of the invention that, if the vehicle is equipped with a passive safety belt system according to our own older patent application No. P 24 34 748.6, a lock stud fixing the closing or applying lever of the solid safety belt system (may) be connected to the lever arm of the three-arm lever associated with the actuation of the swinging latch via a connecting member.

BRIEF DESCRIPTION OF THE DRAWINGS

The invention is described specifically in the following example description with reference to an embodiment illustrated in the drawing. In the drawing.

FIG. 3 is a side view of the guide head of the sliding door suspension according to the invention;

FIG. 4 is a section through the guide head along line IV—IV in FIG. 2;

FIG. 5 is a section through the guide head along line V—V in FIG. 2;

FIG. 6 is a section through the guide head along line VI—VI in FIG. 3;

FIGS. 7 and 7a are a partial section through the guide head along line VII—VII in FIG. 2;

DESCRIPTION OF THE INVENTION

Figure 1:
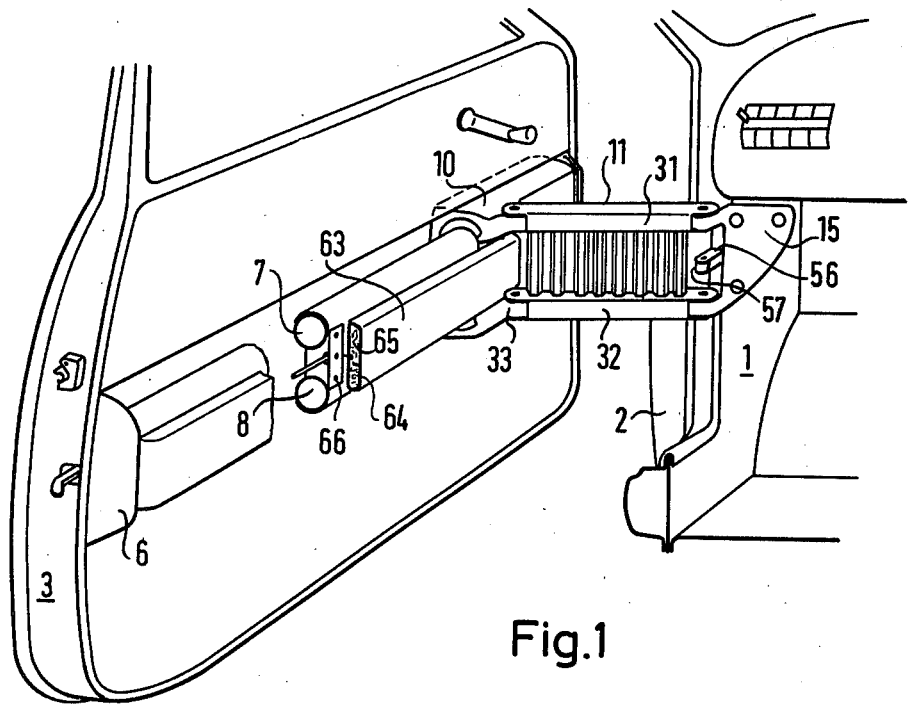
FIG. 1 shows a perspective view of a sliding door according to the invention.
Figure 2:
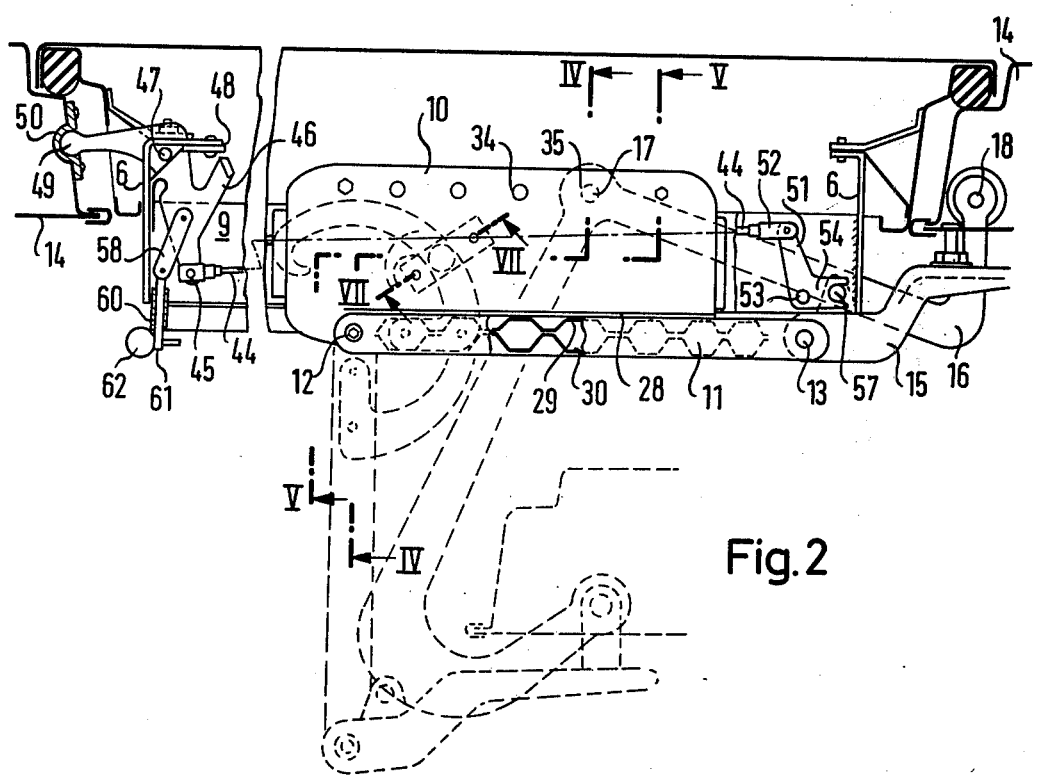
FIG. 2 is a plan view of a sliding door suspension according to the invention FIG. 1.
Figure 8:
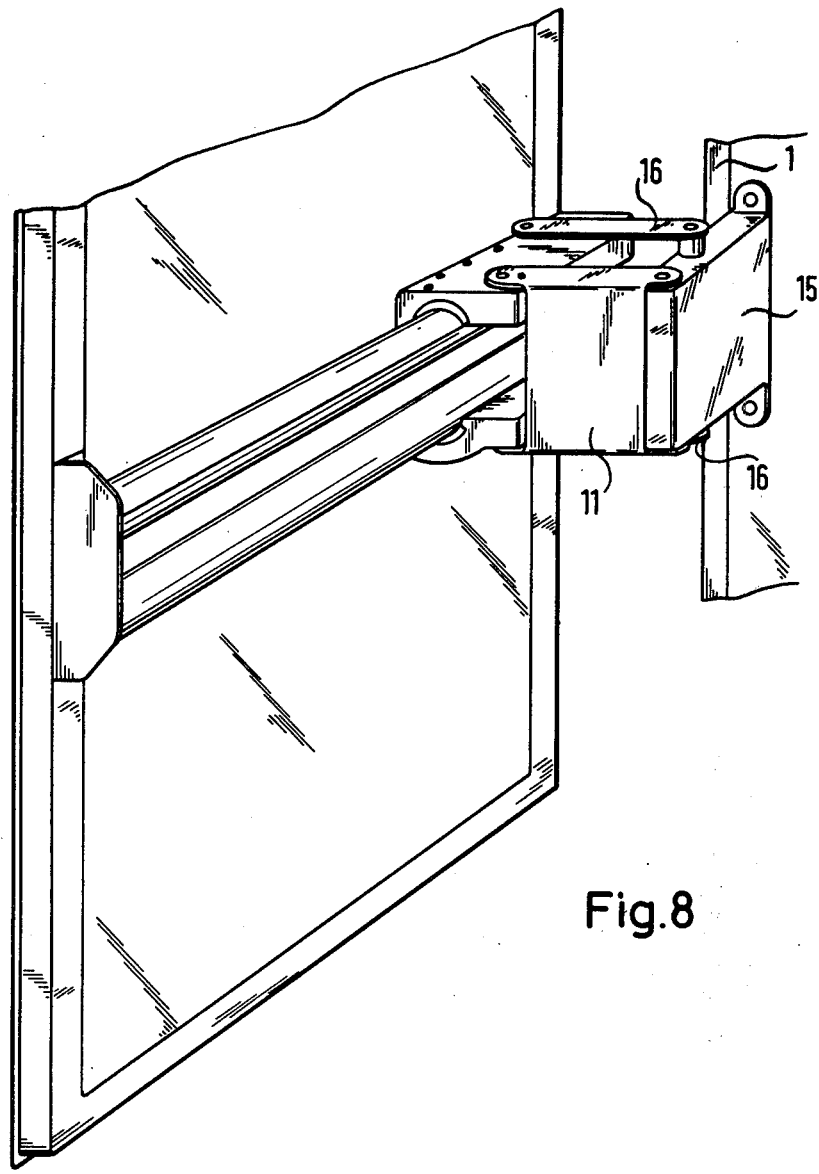
FIG. 8, a perspective view of a sliding door for commercial vehicles with two control links.

In a vehicle construction marked 1 as a whole, the door opening 2 is closable by a door 3 suspended as a sliding door. The door body of door 3 is formed essentially of an outer skin 4 and an inner lining 5. At the end faces of the door body 3, through supporting parts 6, a guide rail 9 formed of two round tubes 7 and 8 lying one above the other at a small distance is fitted. The mutual distance of the two round tubes 7 and 8 is less than the sum of their diameters. Through the guide rail 9, the door body is received by means of a guide head 10 on a supporting system fitted on the vehicle structure 1. The supporting system comprises essentially a supporting arm 11 which is mounted for pivotal movement about parallel axles 12 and 13 on the one hand at the guide head 10 and for pivotal movement on the other hand at a bracket 15 fitted on the vehicle structure in the region of one door column 14. The pivotal movement of the sliding door 3, parallel to itself, into its parallel intermediate position, is brought about by a control link 16, which is fitted about likewise parallel axles 17 and 18 on the one hand at the guide head 10 and on the other hand at the bearing bracket 15. In relation to the guide head 10, the hinge axles of the supporting arm 11 and of the control link 16 are arranged diagonally opposite each other. The guide head 10 consists of two halves 19 and 20, formed in the shown embodiment by castings, which comprise pitch circle-type inner faces 21 and 22 and are connected together through bolts 23 and spacers 24. With the external circumferential wall sections of the round tubes 7 and 8 the guide head cooperates by means of antifriction bodies 26 mounted in the zone of its two end faces for rotation about a pitch circle type axis 25, in such a way that the antifriction bodies 26 roll off on the external circumferential wall sections of the round tubes 7 and 8. The antifriction bodies 26 advantageously have a width which is small in relation to their diameter. The external circumferential walls of the round tubes 7 and 8, on which the antifriction bodies 26 roll off, are lined with a glued-on shell 27 of hardened spring steel, whereby easy motion and wear-free operation is ensured. On their side wall 28 toward the passenger space the two halves 19 and 20 of the guide head are recessed over a part of their length in such a way that the supporting arm 11 articulated on the other hand at the car body 1 is at least partly embedded in the inner long side of the guide head when the sliding door is closed. The supporting arm itself is flat and formed uniformly over its entire height and is formed in the shown embodiment by two upright interconnected corrugated sheetmetal sections 29 and 30 as well as an upper cross-piece 31 and a lower cross-piece 32. In the zone of the supporting arm ends, bearings lugs 33 are provided at the cross-pieces 31 and 32 to mount the supporting arm on the guide head 10 and on the bearing bracket 15, respectively. The two guide head halves 19 and 20 are connected together through at least three tension bolts 23 and spacing sleeves 24 passing through over the total guide head height and traversing corresponding recesses 34 and 35 in the guide head halves 19 and 20 without play. As is visible from FIG. 4, the control link bearing 17 diagonally opposite the guide head-side pivot bearing 12 of the supporting arm 11 in relation to the guide head 10 is connected to the tension stud 24. With the tension stud 24 are associated at least two recesses 34, 35 lying alongside each other, which make possible an adjustment of the articulated axle of the control link according to the requirements of the particular vehicle type. When pivoting the sliding door 3 out into its parallel intermediate position, first the guide rail 9 must be locked relative to the guide head 10 against longitudinal displacement, while during longitudinal shifting of the sliding door 3 the guide head 10 must be locked against pivotal movement relative to the supporting arm 11. This locking is effected in the shown embodiment by a control slide 36 which is axially displaceable in a bore 37 in the lower guide head half 20 and consists of a plastic body 39 and steel balls 40 inserted therein at the end faces. With the steel balls 40 is associated on the one hand a round recess in the external profile face of the lower round tube 8 and on the other hand a recess 42 in a sheetmetal segment 43 extending in arc-of-circle form around the supporting arm hinge 12 on the guide head side, in such a way that during the pivoting out of the sliding door 3 the control slide 36 is engaged in the recess 41 of the lower round tube 8 of guide rail 9 and snaps out of its as soon as the sliding door 3 has reached its fully opened intermediate position, whereby it simultaneously engages in the bore 42 of the sheetmetal segment 43 and thereby abolishes the mutual pivotal mobility between supporting arm 11 and guide head 10. Between the round tubes 7 and 8 of guide rail 9, a pull-push rod 44 extending over their total length is arranged, which at the front end is connected through a joint 45 to a three-armed lever 49, which in turn is fastened for pivotal movement about a vertical axis 47 on the guide rail 9. The third arm 46 of the three-arm lever 49 is fixed by the locking lever 48, which in turn is operable by the knob of an ordinary door lock not specifically shown in the drawing, and thus causes the locking of the pivot latch 49, which in turn engages in a corresponding recess on one door column 14 of the car body 1. At the other end, the sliding door 3 is secured in its closed position through a pivot lever 51, which is connected through a joint 52 to the push-pull rod 44 and is suspended on the guide rail 9 pivotable about a vertical axis 53. The lever arm 54 of pivot lever 51 has a U-shaped recess 55, through which it cooperates with a roll 57 suspended on the supporting arm 11 or bracket 15 through rigid side flanges 56. Through a special link 58 connected to the three-arm pivot latch 49, a lock pin 61 mounted for axial displacement in a guide 60 extending crosswise to the guide rail 9 can be displaced together with the pivot latch 49. With this lock pin 61, in vehicles which are equipped with a passive safety belt system according to our own older proposals No. P 24 34 748.6, the closing or applying lever 62 of the belt system can be fixed in its closing or applying position. It is particularly advantageous here that the locking and release of the applying lever 62 occurs automatically with the unlocking and locking, respectively, of the door. The guide rail 9 consisting of the two round tubes 7 and 8 is covered by a side pad 63 at least over the greater part of its length on the side exposed to view toward the interior of the car. The side pad 63 comprises an outer or visible skin 64 of any shape and a foam core 65, as well as a fastening means which in the shown embodiment consist of U-shaped sheetmetal shackles 66 and span the internal circumferential walls of the tubes 7 and 8 at least partially.

To these U-shaped sheetmetal shackles the padding 63 is fastened by means of sheetmetal screws or clips in known manner.

I claim:

1. In a sliding door assembly for motor vehicles including a supporting system arranged to be supported from a frame of the vehicle and a door carried by said supporting system for longitudinal displacement therein, the improvement wherein said supporting system comprises:

a support arm mounted at one end thereof for pivotal movement about a first vertical axis on the frame of said vehicle;

a multi-part guide head pivotally mounted at the opposite end of said support arm for movement about a second axis parallel to said first axis;

a guide rail assembly mounted on said door extending substantially horizontally over substantially the entire width of said door, said guide rail assembly being cooperatively engaged with said guide head for relative sliding movement therebetween, said guide rail assembly essentially comprising a pair of tubular members each having at least approximately equivalent diameters and extending generally parallel to each other essentially along the length of said guide rail assembly, said pair of tubular members being vertically spaced apart a distance not greater than the sum of the diameters of both said tubular members, with opposite circumferential surfaces of said tubular members forming sliding guides for sliding cooperative engagement with separate parts of said guide head;

said door being displaceable to an intermediate opened position parallel with a closed position through pivotal movement of said supporting system and longitudinally displaceable to a fully opened position by sliding movement of said guide rail in said guide head.

2. The sliding door assembly according to claim 1 further comprising a plurality of antifriction bodies carried within said guide head and arranged along an arc of a circle for engaging said sliding guides of said tubular members.

3. The sliding door assembly according to claim 1 further comprising an external pad covering at least a portion of the length of said tubular members, and means for rigidly fastening said pad to said tubular members.

4. The sliding door assembly according to claim 3 wherein said pad comprises a foam core, an outer skin covering said core, and a metallic reinforcing insert longitudinally extending along said pad, and wherein said means for fastening said pad to said tubular members comprises fastener elements connected at one side thereof to said reinforcing insert and at the other side thereof to said tubular members.

5. The sliding door assembly according to claim 4 wherein said fastener elements comprise curved securing members complementarily fitting with opposed curved surfaces of said tubular members.

6. The sliding door assembly according to claim 1 further comprising longitudinally extending arcuate shell members made of wear resistant material and carried on each of said tubular members substantially along the entire length thereof covering opposite arcuate circumferential surfaces of each of said tubular members forming said sliding guides.

7. The sliding door assembly according to claim 6 wherein said arcuate shell members are made of hardened spring steel.

8. The sliding door assembly according to claim 6 wherein said arcuate shell members are made of plastic material.

9. The sliding door assembly according to claim 1 wherein said guide head comprises upper and lower guide members each having inwardly facing curved guide surfaces for cooperating with said sliding guides of said tubular members, and a plurality of screw bolts and spacers connecting said guide members to form said guide head, said guide members being spaced apart with said guide surfaces facing each other.

10. The sliding door assembly according to claim 9 further comprising at least one row of rotatable members mounted for rotation about an arcuate axle positioned at longitudinal ends of each guide member of said guide head, each of said rotatable members of said row riding on the external surface of the sliding guide of one of said tubular members thereby forming antifriction rotating elements as said guide rail slides through said guide head.

11. The sliding door assembly according to claim 10 wherein said rotatable members are discs having an axial length substantially less than the diameters of said discs.

12. The sliding door assembly according to claim 9 wherein each of said guide members of said guide head have a recess formed on a side thereof facing the interior of said vehicle, said recess extending over a longitudinal distance sufficient to accommodate said support arm of said supporting system so that said support arm is at least partially accommodated within said recess in said guide head when said door is in the closed position.

13. The sliding door assembly according to claim 12 wherein said support arm has flat surfaces and is of uniform thickness throughout its length.

14. The sliding door assembly according to claim 13 wherein said bolts connecting said guide members are tension bolts extending across the entire height of said guide head and passing through bolt receiving bores in said guide members substantially without play, and wherein said spaces comprise a spacer sleeve carried by each said bolt.

15. The sliding door assembly according to claim 1 further comprising a locking device for locking the position of said guide rail with respect to said guide head during pivotal movement of said supporting system and for locking said guide head so as to prevent pivotal movement thereof about said second axis when said door is being longitudinally displaced, said locking device comprising an arcuately shaped sheet metal segment having a first recess formed therein, said segment encircling said second axis and being fastened at one end thereof to said supporting arm, a control slide positioned in said lower guide member carrying spherically shaped members on upper and lower sides thereof, and a recess formed in said lower tubular member, so that one of said spherical members engages said recess in said lower tubular member for locking said guide rail with respect to said guide head and said other spherical member engages said recess in said arcuately shaped segment for locking said guide head against pivotal movement.

16. The sliding door assembly according to claim 14 further comprising a bracket arranged to be mounted on the vehicle for pivotally supporting said support arm, a control link mounted at one end thereof to said bracket for pivotal movement about a third axis parallel to said first and second axes and mounted at the other end thereof to said guide head for pivotal movement about a fourth axis parallel to said third axis, said fourth axis being oriented diagonally opposite said second axis and being formed by one of said tension bolts connecting said first and second guide members.

17. The sliding door assembly according to claim 16 wherein a line connecting said first and second axes lies parallel to a line connecting said third and fourth axis when said sliding door is in the closed position.

18. The sliding door assembly according to claim 17 further comprising at least two articulation means lying alongside each other associated with said lower guide member and associated with said fourth axis.

19. The sliding door assembly according to claim 1 further including means for latching opposite ends of said door in a closed position, said latching means comrprising a pivot latch mounted at one end of said door for substantial axial movement between a latched position engaging one door column of the door frame of said vehicle and an unlatched position free of said door column, a pivot lever mounted on said guide rail at the other end of said door for pivotal movement between a latched and an unlatched position, a holding pin engaged by said pivot lever when in the latched position, and actuating means for moving said pivot latch and said pivot lever between said latched and unlatched positions.

20. The sliding door assembly according to claim 19 wherein said actuating means comprises a three-arm lever mounted on said guide rail for pivotal movement about a fifth vertical axis, a locking lever movably mounted between a locked and unlocked position, said locking lever connected with and operable by a door lock mechanism of said vehicle for engaging one of the arms of said three-arm lever to cause pivotal movement thereof and to cause axial displacement of said pivot latch between the latched and unlatched positions thereof, and a push-pull rod connected at one end thereof to said three-arm lever and at the other end thereof to said pivot lever for pivoting said pivot lever between the latched and unlatched positions in response to pivotal movement of said three-arm lever, said push-pull rod extending between said tubular members.

21. The sliding door assembly according to claim 1 wherein said pivot lever is a two-arm lever, the distal end of one of said arms having a U-shaped section for engaging said holding pin, said two-arm lever being mounted for pivotal movement on at least one of said tubular members.

22. The sliding door assembly according to claim 19 further comprising a lock pin mounted for axial displacement, a link connected at one end thereof to said three-arm lever and at the other end thereof to said lock pin, and means connected to said lock pin for locking and releasing a passive safety belt system in response to axial displacement of said lock pin.

* * * * *